US009148032B1

United States Patent
Frost et al.

(10) Patent No.: US 9,148,032 B1
(45) Date of Patent: Sep. 29, 2015

(54) ESTIMATING POWER CONSUMPTION OF AN ELECTRONIC CIRCUIT

(75) Inventors: Alan M. Frost, Cupertino, CA (US); Smitha Sundaresan, Louisville, CO (US)

(73) Assignee: XILINX, INC., San Jose, CA (US)

( * ) Notice: Subject to any disclaimer, the term of this patent is extended or adjusted under 35 U.S.C. 154(b) by 786 days.

(21) Appl. No.: 13/488,931

(22) Filed: Jun. 5, 2012

(51) Int. Cl.
  *G01R 21/00* (2006.01)
  *H02J 7/00* (2006.01)
  *G01R 21/06* (2006.01)

(52) U.S. Cl.
  CPC ...................................... *H02J 7/007* (2013.01)

(58) Field of Classification Search
  CPC .............................. G06F 17/5054; H02J 7/007
  See application file for complete search history.

(56) References Cited

U.S. PATENT DOCUMENTS 8,146,035 B1 * 3/2012 Schumacher et al. ........ 716/109

OTHER PUBLICATIONS

Xilinx, Inc., Power Methodology Guide, UG 786 (v13.1), Mar. 1, 2011, pp. 1-52, Xilinx, Inc, San Jose, California, USA.*
Xilinx, Inc., Seven Steps to an Accurate Worst-Case Power Analysis Using Xilinx Power Estimator (XPE), WP353 (v1.0), Sep. 30, 2008, pp. 1-15, Xilinx, Inc., San Jose, California, USA.*
Xilinx, Inc., *Power Methodology Guide*, UG786 (v13.1), Mar. 1, 2011, pp. 1-52, Xilinx, Inc., San Jose, California, USA.
Xilinx, Inc., *Seven Steps to an Accurate Worst-Case Power Analysis Using Xilinx Power Estimator (XPE)* WP353 (v1.0), Sep. 30, 2008, pp. 1-15, Xilinx, Inc., San Jose, California, USA.

* cited by examiner

*Primary Examiner* — Phuong Huynh
(74) *Attorney, Agent, or Firm* — LeRoy D. Maunu (57) ABSTRACT

Approaches for estimating power consumption of an electronic circuit from values of configuration parameters. A user is prompted for values of a first subset of the configuration parameters in a first user interface window that is separate from a second user interface window that provides default values of a second subset of the configuration parameters. An estimated level of power consumption of the electronic circuit is determined by a computer as a function of the user-entered values of the first subset of parameters and the default values of the second subset of parameters. The estimated level of power consumption, the user-entered values of the first subset of parameters, and the default values of the second subset of parameters are simultaneously displayed in a third user interface window. The values of both the first subset and second subset of parameters are editable in the third user interface window.

20 Claims, 8 Drawing Sheets

ESTIMATING POWER CONSUMPTION OF AN ELECTRONIC CIRCUIT

FIELD OF THE INVENTION

One or more embodiments generally relate to estimating power consumption in an electronic circuit.

BACKGROUND

Power consumption is becoming an increasingly important design consideration for electronic devices. Estimating power consumption for a circuit design that is to be implemented in a programmable IC (integrated circuit) such as a PLD (programmable logic device) is typically performed using designer-estimated resource counts or information from a completely implemented design. The power estimation also uses clock frequencies and global toggle rate defaults, which may be individually changed by the designer.

One power estimation tool requires a user to enter detailed information in numerous spreadsheets. If accurate information is specified in the numerous spreadsheets, the resulting power estimate will also be accurate. However, a highly inaccurate power estimate may result if a key item is omitted, an incorrect value is entered, or a default value is overlooked and that default value is inconsistent with the intended design. Another tool reduces the amount of data that a user must enter and thereby reduces the chances of inaccurate default values causing an inaccurate power estimate. However, by greatly reducing the number of parameters that the user can specify, the resulting power estimate may be less accurate than desired. Yet another tool requires a complete placed-and-routed circuit design. While an accurate power estimate may be obtained with a complete design, it may be desirable to have an accurate power estimate much earlier in the design process.

SUMMARY

In one embodiment, a method of estimating power consumption of an electronic circuit from values of configuration parameters of the circuit is provided. The method includes, using a computer processor, prompting for values of a first subset of the configuration parameters in a first user interface window that is separate from a second user interface window that provides default values of a second subset of the configuration parameters. User-entered values of the first subset of parameters are received via the first user interface window. In response to user submission of the values of the first subset of parameters via the first user interface window, an estimated level of power consumption of the electronic circuit is determined with a computer processor as a function of the user-entered values of the first subset of parameters and the default values of the second subset of parameters. The estimated level of power consumption, the user-entered values of the first subset of parameters, and the default values of the second subset of parameters are simultaneously displayed in a third user interface window. The values of both the first subset and second subset of parameters are editable in the third user interface window.

In another embodiment, an article of manufacture is provided. The article of manufacture includes a non-transitory storage medium configured with instructions that when executed by one or more processors cause the one or more processors to perform a process of estimating power consumption of an electronic circuit from values of configuration parameters of the circuit. The process includes using a computer processor, prompting for values of a first subset of the configuration parameters in a first user interface window that is separate from a second user interface window that provides default values of a second subset of the configuration parameters. User-entered values of the first subset of parameters are received via the first user interface window. In response to user submission of the values of the first subset of parameters via the first user interface window, an estimated level of power consumption of the electronic circuit is determined with a computer processor as a function of the user-entered values of the first subset of parameters and the default values of the second subset of parameters. The estimated level of power consumption, the user-entered values of the first subset of parameters, and the default values of the second subset of parameters are simultaneously displayed in a third user interface window. The values of both the first subset and second subset of parameters are editable in the third other user interface window.

A system for estimating power consumption of an electronic circuit from values of configuration parameters of the circuit is provided in another embodiment. The system includes a computer system and a storage arrangement coupled to the computer system. The storage arrangement is configured with instructions that when executed by the computer system cause the computer system to perform a process of estimating power consumption of an electronic circuit from values of configuration parameters of the circuit. The process includes using a computer processor, prompting for values of a first subset of the configuration parameters in a first user interface window that is separate from a second user interface window that provides default values of a second subset of the configuration parameters. User-entered values of the first subset of parameters are received via the first user interface window. In response to user submission of the values of the first subset of parameters via the first user interface window, an estimated level of power consumption of the electronic circuit is determined with a computer processor as a function of the user-entered values of the first subset of parameters and the default values of the second subset of parameters. The estimated level of power consumption, the user-entered values of the first subset of parameters, and the default values of the second subset of parameters are simultaneously displayed in a third user interface window. The values of both the first subset and second subset of parameters are editable in the third user interface window.

Other embodiments will be recognized from consideration of the Detailed Description and Claims, which follow.

BRIEF DESCRIPTION OF THE DRAWINGS

Various aspects and advantages of the disclosed embodiments will become apparent upon review of the following detailed description and upon reference to the drawings, in which:

FIG. 3 shows a user interface window for entering values of the quick-estimate subset of configuration parameters of an electronic circuit;

DETAILED DESCRIPTION

One or more embodiments estimate power consumption of an electronic circuit from values of configuration parameters of the circuit. The embodiments allow a user to use both a reduced set of configuration parameters as well as a comprehensive set of configuration parameters. The reduced set is a subset of the comprehensive set of parameters, and the configuration parameters in the reduced set are for the elements of the circuit that most affect power consumption. To obtain a quick estimate of the power consumption, the user is prompted in a user interface window to enter values for only the configuration parameters in the reduced set. When obtaining the quick estimate, the user is not prompted for values of those elements that rarely or insignificantly contribute positively or negatively to the overall power consumption. Thus, the user is less likely to overlook a default value of a significant parameter. Default values are used for the configuration parameters of those elements of less significance.

From the user-entered values of the reduced set of configuration parameters and default values of the less significant parameters, a programmed computer determines the estimated level of power consumption. The estimated level of power consumption, the user-entered values of the reduced set of parameters, and the default values of the less significant parameters are simultaneously displayed and are editable in one or more user interface windows. Thus, the user is provided with a quick estimate of power consumption along with the option of estimating power consumption with a more detailed specification of values of parameters.

Figure 1:
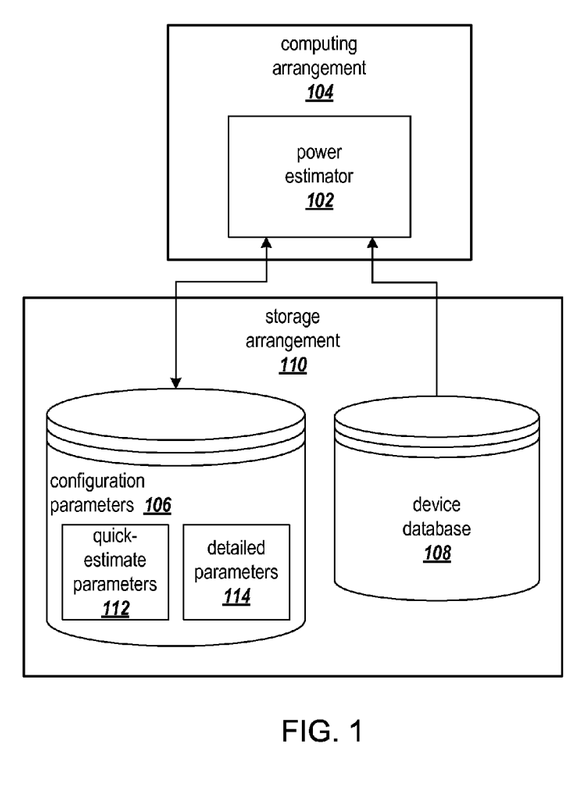
FIG. 1 is a block diagram that shows a system for estimating the level of power consumption of an electronic circuit.

FIG. 1 is a block diagram that shows a system for estimating the level of power consumption of an electronic circuit. The system generally includes a power estimator 102 that executes on a computing arrangement 104, along with configuration parameters 106 and a device database 108 that are retentively stored in a storage arrangement 110. The configuration parameters include quick-estimate parameters 112 and detailed parameters 114. The quick-estimate parameters are the previously mentioned reduced set of parameters, and the detailed parameters are the less significant parameters.

The power estimator 102 provides a function for providing a quick power estimate as well as a function for providing a detailed power estimate. In commencing processing, the power estimator prompts the user to identify the target device to be used in hosting the circuit design. For example, programmable ICs such as programmable logic devices (PLDs) are available in a variety of types and families. PLDs include complex programmable logic devices (CPLDs) as well as field programmable gate arrays (FPGAs), for example. Within each type of PLD there are devices with different capabilities. For example, VIRTEX® 6 and VIRTEX® 7 families of FPGAs are available from XILINX®, Inc., and each family of FPGAs has a number of different configurations. For ease of reference, the particular device on which the circuit is intended to be implemented is simply referred to as the target device.

In response to user selection of a target device and user initiation of the quick-estimator function, the power estimator determines from the device database 108 the set of configuration parameters and default values that are associated with the target device. Each device will have a different set of hardware elements for which values of configuration parameters may be specified. Thus, the power estimator reads the set of configuration parameters associated with the target device from the device database 108.

The power estimator prompts the user for values of the quick-estimate parameters 112 and uses the user-specified values and the default values of the detailed parameters to compute the power estimate. The estimated level of power consumption, the user-entered values of the quick-estimate parameters, and the default values of the detailed parameters are simultaneously displayed and are editable in one or more user interface windows.

Computing arrangement 104 is representative of the various alternative computing arrangements or computer systems, which may include one or more processors and a memory arrangement configured with program code that would be suitable for hosting the processes and data structures of the different embodiments. The program code that implements the processes may be provided via a variety of computer-readable storage media or delivery channels, such as magnetic or optical disks or tapes, electronic storage devices, or as application services over a network. It will be appreciated that the computing arrangement may be embodied in a number of different form factors, ranging from mobile devices, such as smart phones and tablets, to desktop systems.

Computing arrangement 104 includes one or more processors (not shown) coupled to a memory (not shown). The architecture of the computing arrangement depends on implementation requirements as would be recognized by those skilled in the art. The processor may be one or more general purpose processors, or a combination of one or more general purpose processors and suitable co-processors, or one or more specialized processors (e.g., RISC, pipelined, etc.). The memory stores the program code and data structures for providing the user interface windows and computing the power estimate as described herein.

The storage arrangement 110 provides local and/or remote persistent storage, such as provided by magnetic disks (not shown), or solid state memory, such as flash memory. The storage arrangement may include one or both of local and remote storage, with remote storage being coupled to the processor arrangement via a local area network, for example.

Figure 2:
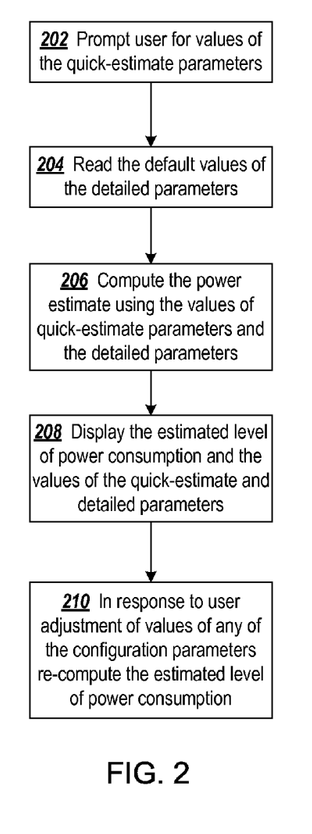
FIG. 2 is a flowchart of a process for estimating the level of power consumption of an electronic circuit.

FIG. 2 is a flowchart of a process for estimating the level of power consumption of an electronic circuit. At block 202, the user is prompted for the values of the quick-estimate parameters, and at block 204, the process reads the default values of the detailed parameters. The estimated level of power consumption is computed at block 206 using the user-entered values of the quick-estimate parameters and the default values of the detailed parameters. At block 208, the estimated level of power consumption is displayed along with the values of the quick-estimate parameters and detailed parameters. In one embodiment, after completing the quick estimate, the values of both the quick-estimate parameters and the detailed parameters are editable by the user. In response to user adjustment of any of the values, the estimated level of power consumption is re-computed at block 210.

The embodiments of the present invention provide a simplified way for a user to provide input data to the power estimator for quickly estimating the level of power consumption of a circuit. By enhancing existing technology, the function of estimating power consumption based on a full set of configuration parameters is leveraged to estimate power consumption based on user input for only a selected subset of those parameters. For example, the Xilinx Power Estimator (XPE) software estimates a level of power consumption based on values of a full set of configuration parameters that are editable by the user. The XPE may be adapted to compute the estimated power level based on the user-entered values for the quick-estimate parameters and the default values of the detailed parameters. Together, the user-entered values for the quick-estimate parameters and the default values of the detailed parameters are a full set for configuration parameters for computing the power estimate by the XPE. Other tools may be similarly adapted or new tools may be developed to operate in a similar manner.

FIG. 3 shows a user interface window 250 for entering values of the quick-estimate subset of configuration parameters of an electronic circuit. Though only one user interface window is shown for entering the quick-estimate parameter values, it will be appreciated that in another embodiment the user may be prompted for the values of the quick-estimate subset of configuration parameters in a sequence of user interface windows such that different ones of the parameter values are entered in the different windows.

The user interface window 250 shows the quick-estimate configuration parameters for a previously selected target device ("XC7VH290THCG1155-2C"). In one embodiment, the configuration parameters that are applicable for the target device are obtained from the device database. The parameters that are presented in the user interface window dynamically reflect the configurable resources that are available on the target device. For the example target device, gigabit transceivers GTH and GTZ are available. However, for other devices there are no gigabit transceivers, and the quick-estimate configuration parameters would not be presented for editing for such devices.

The quick-estimate parameters generally include an expected operating temperature 252; a volume of air movement 254; a voltage level 256; resource utilization parameters 258, including overall numbers of and respective utilization levels of one or more configurable resources of the circuit; clocking parameters 260 including a clock rate, a toggle rate, and an enable rate of one or more configurable resources of the circuit; and physical interface parameters 262 including identification of each physical input/output interface, a width of each interface, and a data rate of each interface.

The expected operating temperature parameter 252 allows the user to choose an ambient or junction operating temperature. In one embodiment, a pull down list of temperatures is presented. The environment parameter 254 allows the user to specify a level of air movement and whether or not a heatsink is to be used. A pull down list of options is provided. Either a nominal or maximum voltage supply level may be specified for the voltage parameter 256. Values of the thermal parameters may be adjusted after performing the quick estimate to take into account a particular circuit board, heatsink and other custom values.

In one embodiment, default values for the resource utilization parameters 258 are obtained from the device database. The default values may be based on averages of resources used in other designs, for example. For a target device such as an FPGA, the resources include look-up tables (LUTs), flip-flops, block random access memory and digital signal processors. In one embodiment, the numbers of resources entered may be validated against the available resources for the target device. Percentages are complementary to the numbers of resources and provide the option of specifying utilization based on how many of the resources the design is expected to occupy. For example, early in the design process a designer may not know how many LUTs are going to be required by the design. However, the total number of LUTs on the device may be known and based on past experience approximately 70% of the LUTs are expected to be used in the completed design.

The clocking parameters 260 include parameters for different resources in the target device. For example, in an FPGA, clocking parameters are provided for programmable logic and block RAM (BRAM). The clock parameters include a clock frequency, a toggle percentage and an enable percentage. In one embodiment, the maximum allowed speed of selected parameters may be limited to that supported in target device.

The physical interface parameters 262 allow the user to specify particular interfaces and values for basic configurations of those interfaces. For example, a particular type of memory may be specified (e.g., DDR, or RLDRAM), and the bit-width of the data interface and data transfer rate of the interface to that memory may be specified. The physical interfaces parameters may further include gigabit transceivers interfaces (e.g., PCIe) and associated bit-widths data rates. A low-voltage differential signaling interface may also be specified in terms of numbers of inputs, outputs, and bit-rate.

In another embodiment, the values of the quick-estimate parameters may be specified via a scripting interface to XPE (or other estimator). The script may be recorded from user interaction with the graphical interface and thereafter modified, or the script may be created by hand. An example script is shown in Example 1 below.

setEnvironment("Typical 85C",voltage=nominal)
    addLogic (luts=124520, ffs=248500, clk=250, toggle=12.5%, enable=50%)
    addBRAM (count=445, =clk=250, toggle=50%, enable=25%)
    addMemoryInterface ("DDR3", width=36, datarate=1066)
    addTransceiverinterface ("PCIe", lanes=8, datarate=2.5)

Example 1

Figure 4:
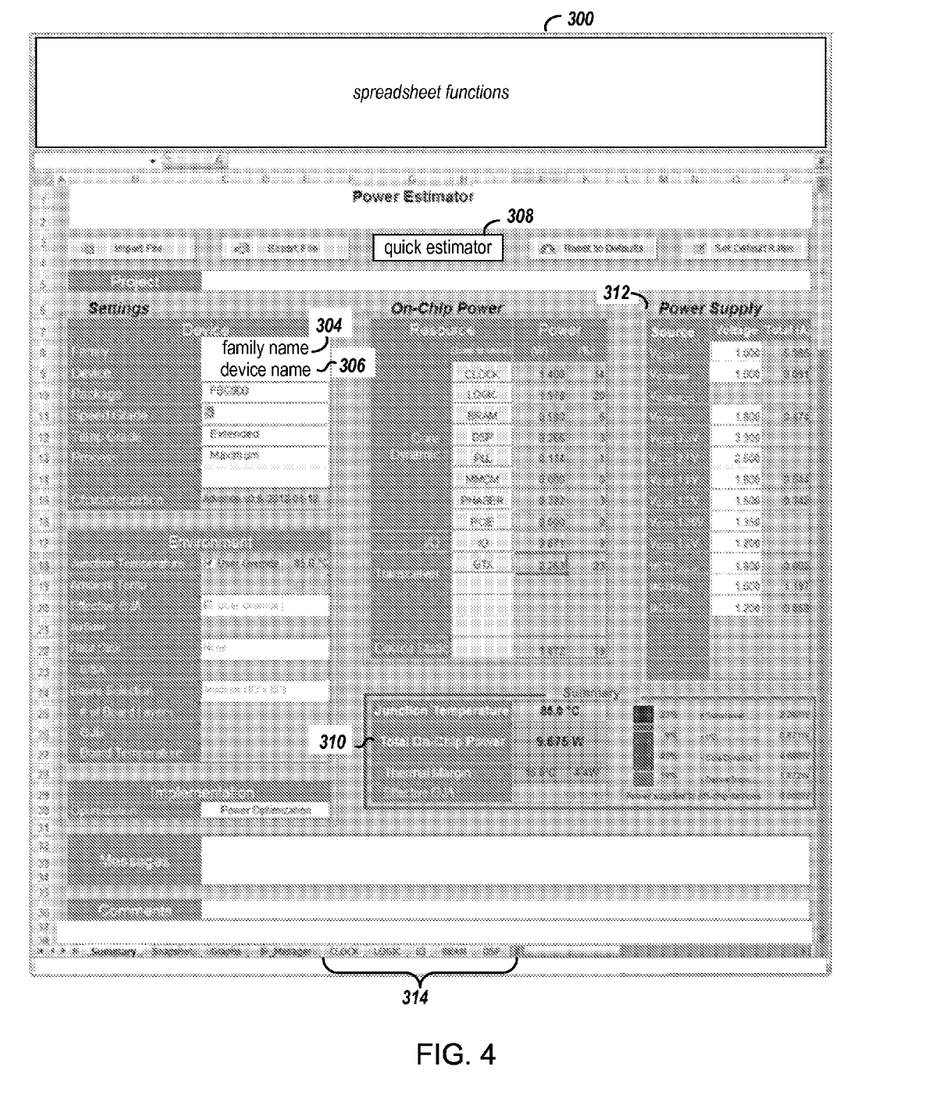
FIG. 4 shows a user interface window from which the quick estimator function can be started.

FIG. 4 shows a user interface window from which the quick-estimator function can be started. The window also shows some of the detailed configuration parameters for which default values are assigned and used in computing the quick estimate of the level of power consumption. In one embodiment, the quick-estimator function may be started from the user interface window 300, and once the user completes entering data in the quick-estimator window (e.g., FIG. 3), window 300 is presented again showing the estimated level of power consumption along selected ones of the detailed parameters in which default values were used for computing the estimate.

In one embodiment, the user interface is a spreadsheet style application. In blocks 304 and 306, the user may specify the family name and the device name of the target device. If a quick estimate of the level of power consumption is desired, quick-estimator button 308 may be selected. In response to selection of button 308, the user interface screen 250 of FIG. 3 is presented.

The power estimator 102 computes the estimated level of power consumption in response to the user-completed entry of the values of the quick-estimate parameters and initiating the computation. The estimated results are displayed in block 310 of user interface window 300, for example. In addition to the computed level of power consumption, default values of some of the detailed parameters are also presented. For example, default values for the detailed configuration parameters such as power supply voltages 312 for different voltage rails are also displayed. These values may be edited in order to compute a power estimate based on more detailed information. In response to changes made to the values of the detailed configuration parameters, the spreadsheet application automatically updates the estimated level of power consumption.

Additional detailed parameters are available for viewing and editing by way of spreadsheet tabs 314. The tabs 314 provide access to detailed clock parameters, logic parameters, input/output parameters, block RAM parameters, DSP parameters as well as other parameters in which the target device is an FPGA.

FIGS. 5-10 show user interface windows in which default values are shown and are editable for various configuration parameters. After having made a quick estimate of the level of power consumption, the user may specify the values of additional configuration parameters of the circuit in order to more accurately determine an estimated power level.

Figure 5:
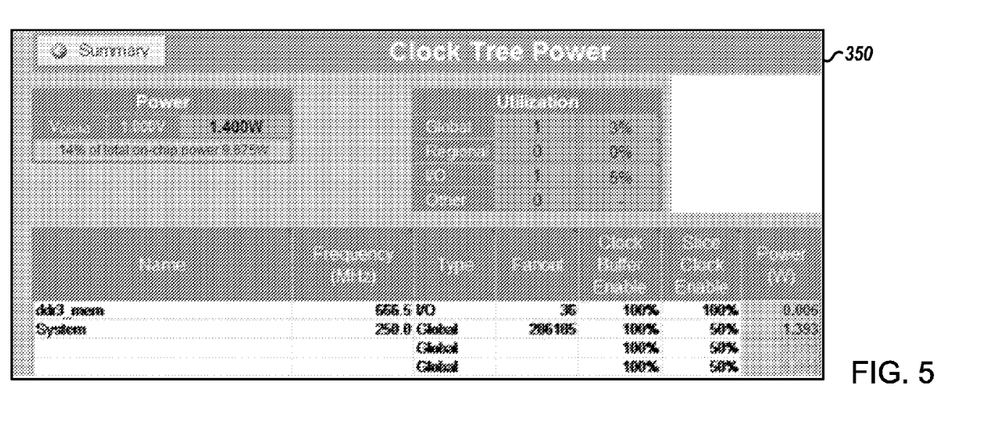
FIG. 5 shows a user interface window for entering values of configuration parameters for clock circuitry.

FIG. 5 shows a user interface window 350 for entering values of configuration parameters for clock circuitry. Example default values are shown for two clock circuits, ddr3_mem and System. The user can further edit the illustrated default values for the clock frequency, clock type, fanout, clock buffer enable percentages and slice clock enable percentages for the two clock circuits.

Figure 6:
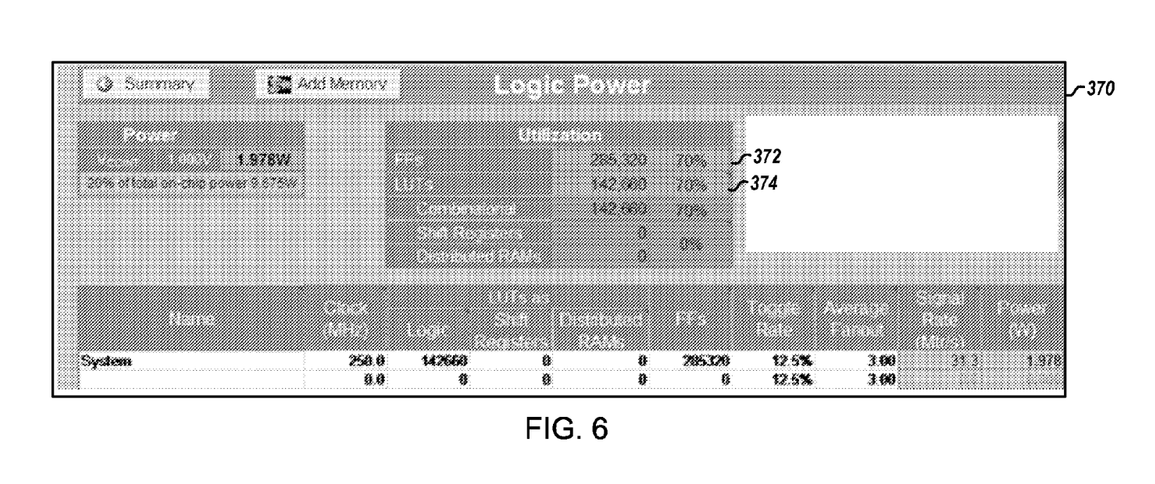
FIG. 6 shows a user interface window for entering values of configuration parameters for programmable logic resources.

FIG. 6 shows a user interface window 370 for entering values of configuration parameters for programmable logic resources. The number of flip-flops and utilization rate 372 and the number of LUTs and utilization rate 374 are the user-entered numbers from the quick-estimate user interface window 250 of FIG. 3. In addition, default values are shown for the number of shift registers, number of distributed RAMs and average fanout, all of which are editable for obtaining a power estimate based on more detailed configuration information. The user can further edit the illustrated specified quick-estimate values and the default values.

Figure 7:
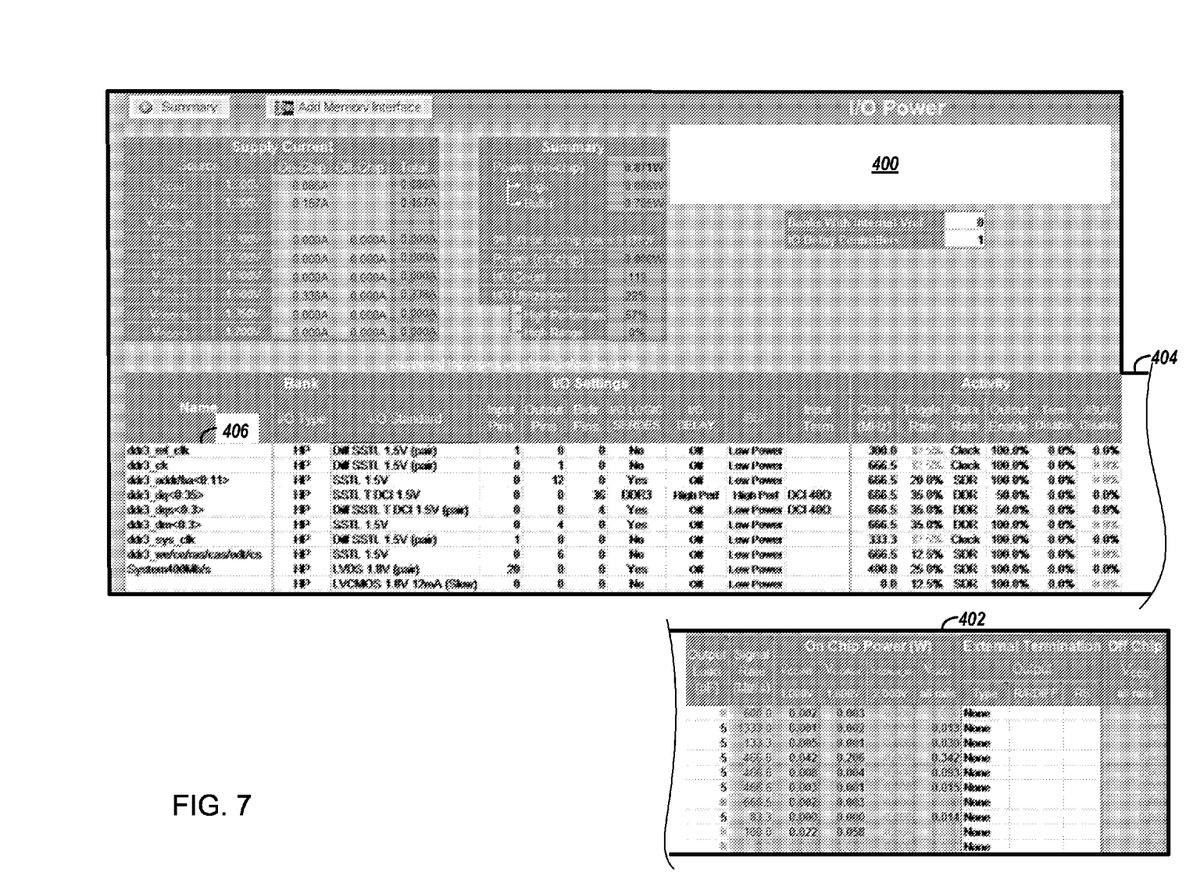
FIG. 7 shows a user interface window for entering values of configuration parameters for I/O resources.

FIG. 7 shows a user interface window 400 for entering values of configuration parameters for I/O resources. Portion 402 is a continuation of portion 404 of the window. The configuration parameters shown in FIG. 7 are for high-performance (HP) I/O bank types for a DDR3 memory interface. The 7 series FPGAs from XILINX offer both high-performance (HP) and high-range (HR) I/O banks. Only HP type banks are shown in the example. Also, different default parameters would be presented for a LPDDR2 interface.

Default I/O circuits are populated for the chosen physical interfaces 262 of FIG. 3 as shown in the name column 406. Default values are shown for the associated I/O standards; numbers of input, output, and bi-directional pins; whether or not a SERDES is present; whether I/O delay is on or off; a level of power for an associated buffer circuit; input termination resistance; default clock rates, toggle rates, data rates, and output enable rates; percentages of terminations and buffer circuits disabled; an output load; and types of external termination. The user can further edit the illustrated specified quick-estimate values and the default values.

Regarding the memory interface, the quick-estimator function ensures that the details of the best known implementation for the target device are entered correctly for power estimation (e.g., on-chip termination and use of optimized (T_DCI) bi-directional standard for data and strobe lines). The quick-estimator function also protects against mistaken values adversely affecting the accuracy of the power estimate (e.g., simply selecting DDR3x36 and the data rate supports power estimation accuracy for the memory interface). High performance options are selected automatically based on user specified data rate.

Figure 8:
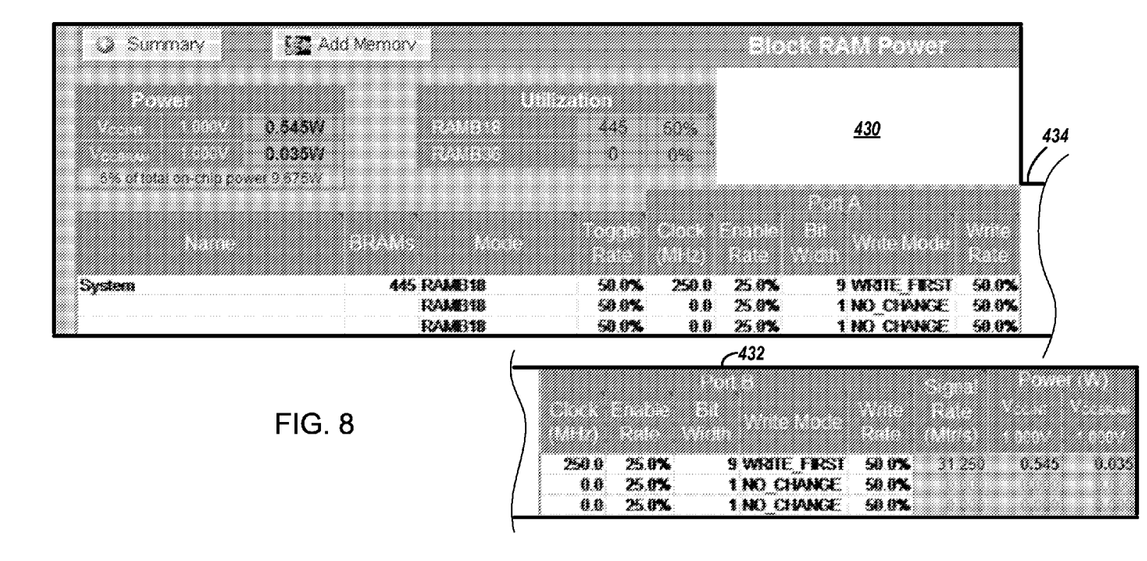
FIG. 8 shows a user interface window for entering values of configuration parameters for block random access memory resources.

FIG. 8 shows a user interface window 430 for entering values of configuration parameters for block random access memory resources. Portion 432 is a continuation of portion 434 of the window. The window shows editable values for the number of BRAMs, toggle rate, clock rate, and enable rate specified in the quick-estimate window 250 of FIG. 3. Default values are editable and shown for the bit width, write mode, and write rate for both ports A and B.

Figure 9:
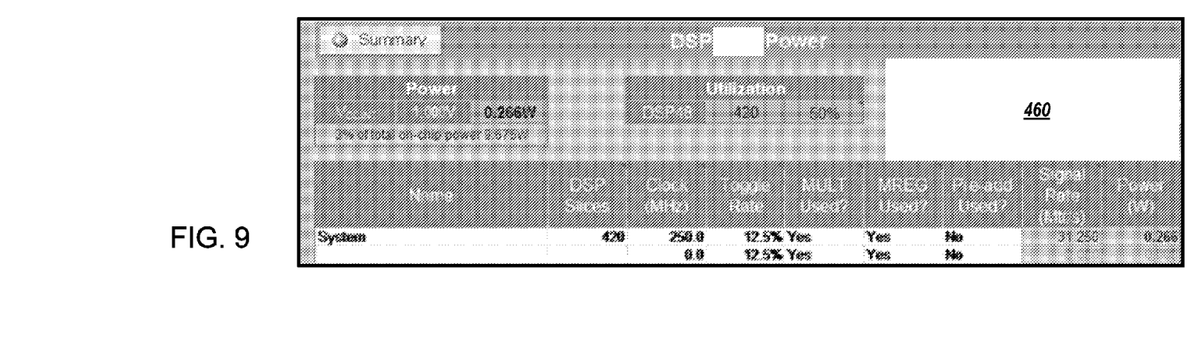
FIG. 9 shows a user interface window for entering values of configuration parameters for digital signal processor resources.

FIG. 9 shows a user interface window 460 for entering values of configuration parameters for digital signal processor resources. The window shows the editable values for the number of DSP slices, the clock rate, and the toggle rate specified in the quick-estimate window 250 of FIG. 3. Default values are editable and shown for whether or not a multiplier is used, an m-register is used, and whether or not a pre-adder is used.

Figure 10:
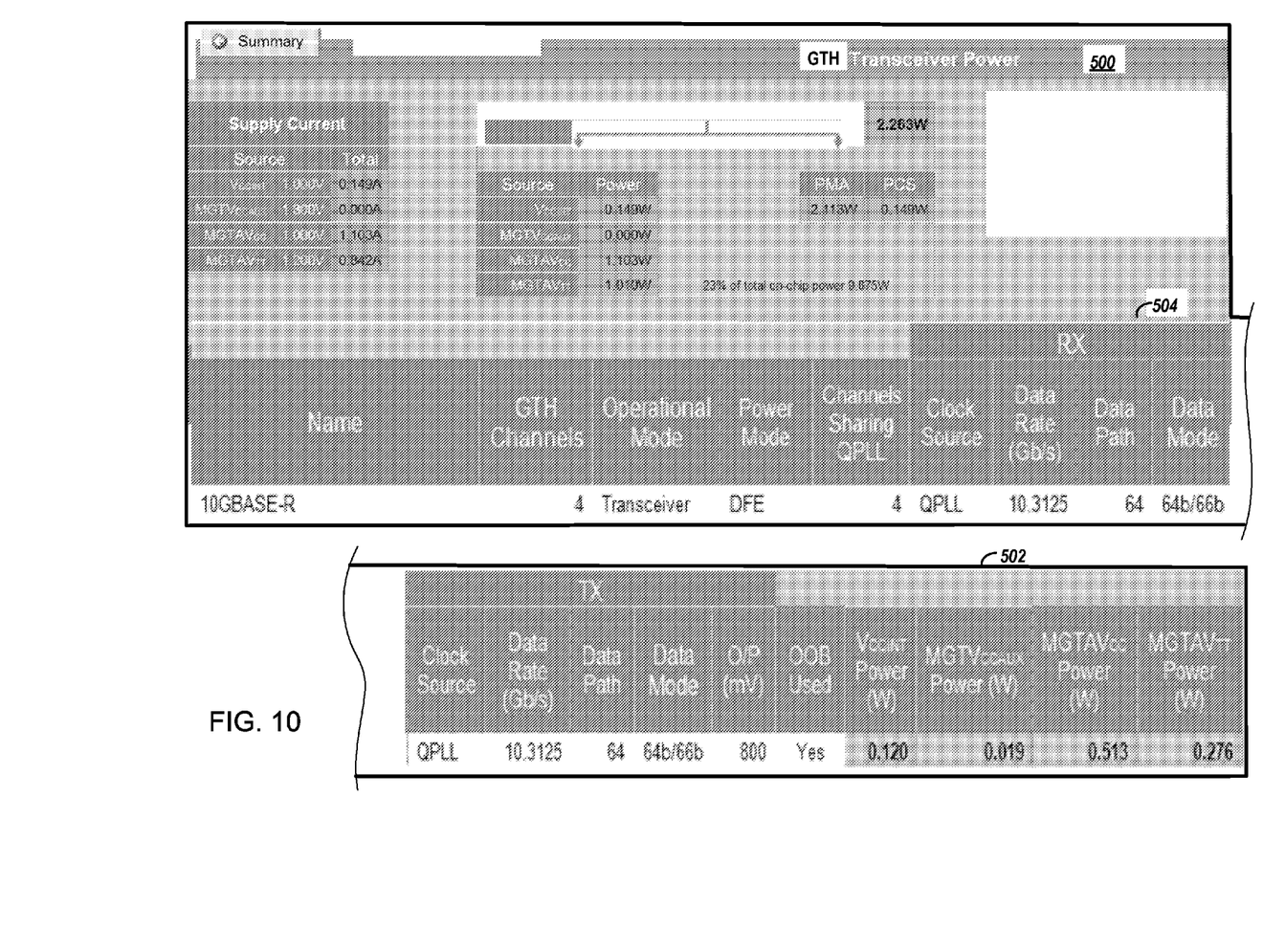
FIG. 10 shows a user interface window for entering values of configuration parameters for a GTH-type gigabit transceiver resource.

FIG. 10 shows a user interface window for entering values of configuration parameters for a GTH gigabit transceiver resource. Portion 502 is a continuation of portion 504 of the window. The 10GBASE-R gigabit transceiver corresponds to the GTH specification in the quick-estimate window 250 of FIG. 3. It will be appreciated that a separate spreadsheet window would be available for viewing and editing for the GTZ gigabit transceiver. The number of 10GBASE-R channels corresponds to the width parameter in the quick-estimate window.

Default values are editable and are shown for the number of power planes and the power mode. For both receiver and transceiver functions, default values are shown and are editable for the clock source, the size of the data path, and the data mode. The transceiver function also has default parameters for 0/P and whether or not OOB is used. O/P is the differential output swing voltage of the transmitter in mV. OOB is an out of band circuit that detects when a physical cable has been unplugged (or plugged back in) from the interface. PCIe, SATA and Ethernet interfaces require this circuit, but the circuit adds power and may be disabled for chip to chip interfaces to save power. Both O/P and OOB are used in the power estimate and the quick estimator sets default values appropriately.

Figure 11:
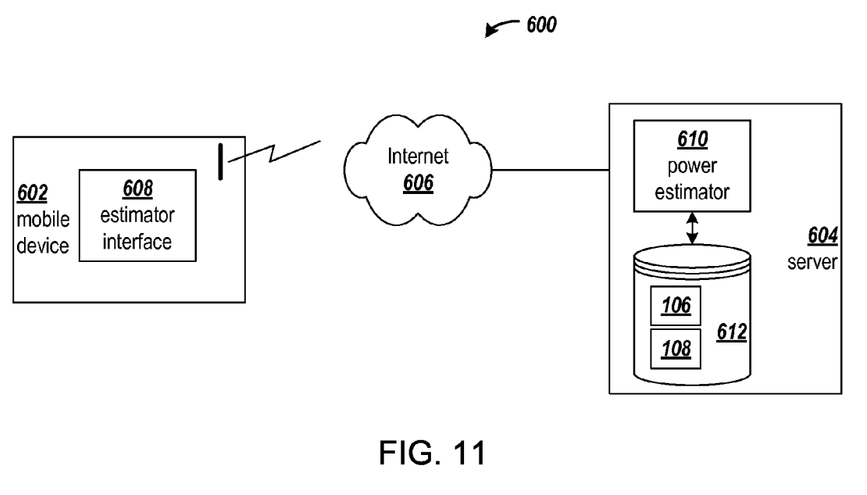
FIG. 11 shows a system in which access to both the quick and detailed power estimator functions are provided on a mobile device.

FIG. 11 shows a system 600 in which access to both the quick and detailed power estimator functions is provided on a mobile device. In one embodiment, a mobile device 602 is coupled to a server 604 via the Internet 606. The mobile device may be a smart phone, tablet or notebook, for example. Alternatively, the mobile device may be a desktop computer. The mobile device may connect wirelessly or via wires to the Internet. Similarly, the server may connect either wirelessly or via wires to the Internet. The server may be any class of computer system that is suitable for operating as a web server, for example.

In one embodiment an estimator interface application 608 executes on the mobile device and interacts with the power estimator application 610, which executes on the server 604. The power estimator uses the device database 108 and configuration parameter database 106 in storage arrangement 612 to prepare a user interface screen or window for the estimator interface to prompt for the quick estimate of power consumption. The estimator interface prompts for values for the quick-estimate parameters, and in response to user-entered data, transmits the entered values back to the power estimator.

In response to receiving the values of the quick-estimate parameters, the power estimator 610 uses default values of detailed parameters from configuration parameter database 106 to compute a power estimate. The resulting estimate is transmitted back to the estimator interface on the mobile device for display. In one embodiment, the power estimator 610 further transmits user interface screens or windows that allow the user to view and edit the full set of configuration parameters. The estimator interface application 608 returns the edited values of the full set of configuration parameters to the power estimator 610 for computation of the power estimate.

In addition to the embodiments described above, the quick estimator may obtain the generic part of the design and then add specific intellectual property (IP) logic cores and other design information in the estimator to complete the estimate. The quick estimator may further capture multiple modules that would be combined for the full chip estimate. An "append" or "module" mode would add modules to the existing data in the power estimator. As is the case with the full device, resource values (e.g., numbers of DSPs) may be set to 0 or blank to indicate none are used. The quick estimator may also compare the levels of power consumption of two or more target devices. For example it may be useful for the designer to know the relative power/thermal tradeoffs for different devices having different transceivers and static power requirements. It may also be useful for comparing different generations of the same device.

The embodiments are thought to be applicable to a variety of systems for estimating the level of power consumption of electronic circuits. Other aspects and embodiments will be apparent to those skilled in the art from consideration of the specification. It is intended that the specification and illustrated embodiments be considered as examples only, with a true scope of the invention being indicated by the following claims.

What is claimed is:

1. A method of estimating power consumption of an electronic circuit from values of configuration parameters of the circuit, comprising:
   using a computer processor, prompting for values of a first subset of the configuration parameters in a first user interface window that is separate from a second user interface window that provides default values of a second subset of the configuration parameters;
   receiving user-entered values of the first subset of parameters via the first user interface window;
   in response to user submission of the values of the first subset of parameters via the first user interface window, determining with the computer processor an estimated level of power consumption of the electronic circuit as a function of the user-entered values of the first subset of parameters and the default values of the second subset of parameters; and
   simultaneously displaying in a third user interface window, the estimated level of power consumption, the user-entered values of the first subset of parameters, and the default values of the second subset of parameters, wherein values of both the first subset and second subset of parameters are editable in the third user interface window.

2. The method of claim 1, wherein the prompting for values of the first subset includes prompting for the values of the first subset of configuration parameters in a sequence of user interface windows.

3. The method of claim 1, further comprising:
   wherein the prompting for values of the first subset includes prompting for the values of the first subset of configuration parameters on a mobile device;
   transmitting the user-entered values of the first subset of configuration parameters from the mobile device to a server;
   wherein the determining of the estimated level of power consumption is performed on the server;
   transmitting the estimated level of power consumption and the default values of the second subset of parameters to the mobile device; and
   wherein the estimated level of power consumption, the user-entered values of the first subset of parameters, and the default values of the second subset of parameters are displayed on the mobile device.

4. The method of claim 1, wherein the simultaneously displaying includes displaying one or more of the user-entered values of the first subset of parameters and a subset of the default values of the second subset of parameters in the third user interface window.

5. The method of claim 1, further comprising opening the first window for prompting for values of the first subset of configuration parameters in response to user selection of a user-interface icon in the second user interface window that provides the default values.

6. The method of claim 1, wherein the first subset of parameters includes:
   an expected operating temperature;
   a volume of air movement;
   respective utilization levels of one or more configurable resources of the circuit;
   a clock rate, a toggle rate, and an enable rate of one or more configurable resources of the circuit; and
   identification of each physical input/output interface, a width of each interface, and a data rate of each interface.

7. The method of claim 6, wherein the configurable resources of the circuit include look-up tables, flip-flops, block random access memory, and digital signal processors.

8. The method of claim 6, further comprising presenting default values for numbers of and utilization rates of look-up tables, flip-flops, block random access memory and digital signal processors.

9. The method of claim 1, further comprising in response to user selection of a device type, reading permitted configuration parameters associated with the device type from a database, wherein the first subset of parameters includes only permitted configuration parameters.

10. The method of claim 9, further comprising:
    reading permitted values of configuration parameters associated with the device type from the database; and
    verifying that the user submitted values of the first subset of parameters are consistent with the permitted values.

11. The method of claim 6, wherein the physical input/output interfaces include a memory controller, a gigabit serial transceiver, and low-voltage differential signaling.

12. The method of claim 1, wherein the second subset of the configuration parameters includes:
    voltage levels for a plurality of voltage rails;
    a plurality of clock circuits and associated frequencies and fanouts;

a plurality of logic circuits and associated clock frequencies, programmable resources, toggle rates, and average fanouts;

a plurality of I/O circuits and associated I/O standards, clock frequencies, numbers of pins, toggle rates; and a plurality of digital signal processing circuits and associated numbers of logic resources, clock frequencies, and toggle rates.

13. An article of manufacture, comprising:

a non-transitory storage medium configured with instructions that when executed by one or more processors cause the one or more processors to perform a process of estimating power consumption of an electronic circuit from values of configuration parameters of the circuit, the process including:

using a computer processor, prompting for values of a first subset of the configuration parameters in a first user interface window that is separate from a second user interface window that provides default values of a second subset of the configuration parameters;

receiving user-entered values of the first subset of parameters via the first user interface window;

in response to user submission of the values of the first subset of parameters via the first user interface window, determining with a computer processor an estimated level of power consumption of the electronic circuit as a function of the user-entered values of the first subset of parameters and the default values of the second subset of parameters; and simultaneously displaying in a third user interface window, the estimated level of power consumption, the user-entered values of the first subset of parameters, and the default values of the second subset of parameters, wherein values of both the first subset and second subset of parameters are editable in the third user interface window.

14. The article of manufacture of claim 13, wherein the prompting for values of the first subset includes prompting for the values of the first subset of configuration parameters in a sequence of user interface windows.

15. The article of manufacture of claim 13, wherein the simultaneously displaying includes displaying one or more of the user-entered values of the first subset of parameters and a subset of the default values of the second subset of parameters in the third user interface window.

16. The article of manufacture of claim 13, wherein the first subset of parameters includes:

an expected operating temperature;

a volume of air movement;

respective utilization levels of one or more configurable resources of the circuit;

a clock rate, a toggle rate, and an enable rate of one or more configurable resources of the circuit; and identification of each physical input/output interface, a width of each interface, and a data rate of each interface.

17. The article of manufacture of claim 16, wherein the configurable resources of the circuit include look-up tables, flip-flops, block random access memory, and digital signal processors.

18. The article of manufacture of claim 13, the process further including:

in response to user selection of a device type, reading permitted configuration parameters associated with the device type from a database, wherein the first subset of parameters includes only permitted configuration parameters.

19. The article of manufacture of claim 18, the process further including:

reading permitted values of configuration parameters associated with the device type from the database; and verifying that the user-submitted values of the first subset of parameters are consistent with the permitted values.

20. A system for estimating power consumption of an electronic circuit from values of configuration parameters of the circuit, comprising:

a computer system; and a storage arrangement coupled to the computer system and configured with instructions that when executed by the computer system cause the computer system to perform a process of estimating power consumption of an electronic circuit from values of configuration parameters of the circuit, the process including:

using a computer processor, prompting for values of a first subset of the configuration parameters in a first user interface window that is separate from a second user interface window that provides default values of a second subset of the configuration parameters;

receiving user-entered values of the first subset of parameters via the first user interface window;

in response to user submission of the values of the first subset of parameters via the first user interface window, determining with a computer processor an estimated level of power consumption of the electronic circuit as a function of the user-entered values of the first subset of parameters and the default values of the second subset of parameters; and simultaneously displaying in a third user interface window, the estimated level of power consumption, the user-entered values of the first subset of parameters, and the default values of the second subset of parameters, wherein values of both the first subset and second subset of parameters are editable in the third user interface window.

* * * * *